(12) United States Patent
Chirgwin et al.

(10) Patent No.: US 9,070,522 B2
(45) Date of Patent: Jun. 30, 2015

(54) SMART WALL PLATE AND MODULAR JACKS FOR SECURE NETWORK ACCESS AND/OR VLAN CONFIGURATION

(71) Applicant: Tyco Electronics UK Ltd., Wiltshire (GB)

(72) Inventors: David John Chirgwin, Chester (GB); David Thomas, Chester (GB); Kevin David Townend, Deeside (GB)

(73) Assignee: Tyco Electronics UK LTD., Wiltshire (GB)

( * ) Notice: Subject to any disclaimer, the term of this patent is extended or adjusted under 35 U.S.C. 154(b) by 253 days.

(21) Appl. No.: 13/800,269

(22) Filed: Mar. 13, 2013

(65) Prior Publication Data

US 2013/0241313 A1    Sep. 19, 2013

Related U.S. Application Data

(60) Provisional application No. 61/611,916, filed on Mar. 16, 2012.

(51) Int. Cl.
    *H01H 47/00* (2006.01)
    *H04L 12/931* (2013.01)

(52) U.S. Cl.
    CPC ............. *H01H 47/00* (2013.01); *Y10T 307/747* (2015.04); *H04L 49/351* (2013.01)

(58) Field of Classification Search
None
See application file for complete search history.

(56) References Cited

U.S. PATENT DOCUMENTS

| | | |
|---|---|---|
| 5,994,998 A | 11/1999 | Fisher et al. |
| 6,140,911 A | 10/2000 | Fisher et al. |
| 6,212,195 B1 | 4/2001 | McCormack et al. |
| 6,329,906 B1 | 12/2001 | Fisher et al. |
| 6,449,348 B1 | 9/2002 | Lamb et al. |
| 6,483,203 B1 | 11/2002 | McCormack |
| 6,496,105 B2 | 12/2002 | Fisher et al. |
| 6,535,983 B1 | 3/2003 | McCormack et al. |
| 6,880,020 B1 | 4/2005 | Rubinstein et al. |
| 6,960,025 B2 | 11/2005 | Gurreri |
| 7,118,286 B2 | 10/2006 | Gurreri et al. |
| 7,143,299 B1 | 11/2006 | Rubinstein et al. |
| 7,182,523 B2 | 2/2007 | Abendschein et al. |
| 7,207,724 B2 | 4/2007 | Gurreri |
| 7,299,287 B1 | 11/2007 | Rubinstein et al. |
| 7,324,488 B1 | 1/2008 | Rubinstein et al. |
| 7,325,976 B2 | 2/2008 | Gurreri et al. |
| 7,734,038 B2 | 6/2010 | Martich et al. |
| 7,747,272 B2 | 6/2010 | Parsa |
| 7,785,138 B2 | 8/2010 | Bonnassieux et al. |

(Continued)

OTHER PUBLICATIONS

European Patent Office, "International Search Report", May 7, 2013, pp. 1-12, Published in: EP.

(Continued)

*Primary Examiner* — Jared Fureman
*Assistant Examiner* — Terrence Willoughby
(74) *Attorney, Agent, or Firm* — Fogg & Powers LLC (57) ABSTRACT

One embodiment is directed to an apparatus comprising one or more front connectors, wherein each front connector comprises a respective interface configured to read a storage device associated with a connector that is adapted to be connected to the front connector. The apparatus further comprises one or more rear connection points and one or more switches. The apparatus is configured to automatically configure the apparatus at least in part based on information read from the storage device.

20 Claims, 6 Drawing Sheets

(56) References Cited

U.S. PATENT DOCUMENTS

| | | |
|---|---|---|
| 2004/0015618 A1 | 1/2004 | Risi et al. |
| 2005/0044199 A1* | 2/2005 | Shiga et al. .................. 709/223 |
| 2005/0177640 A1 | 8/2005 | Rubinstein et al. |
| 2012/0015552 A1 | 1/2012 | Diab et al. |
| 2012/0056491 A1 | 3/2012 | Ho |

OTHER PUBLICATIONS

3COM Corporation, "3Com Intellijack Switch NJ240FX User Guide", "retrieved from http://bizsupport2.austin.hp.com/bc/docs/support/SupportManual/c02583456/c02583456.pdf on Jul. 31, 2013", Mar. 2005, pp. 1-76.

* cited by examiner

SMART WALL PLATE AND MODULAR JACKS FOR SECURE NETWORK ACCESS AND/OR VLAN CONFIGURATION

CROSS-REFERENCE TO RELATED APPLICATION

This application claims the benefit of U.S. Provisional Patent Application Ser. No. 61/611,916, filed on Mar. 16, 2012, which is hereby incorporated herein by reference.

BACKGROUND

In some applications, it is desirable to ensure that only certain cables are plugged into certain jacks of a wall plate or similar device. One way to do this is to use physically "keyed" plugs and jacks that are designed to be used with one another. That is, only a keyed plug specially designed to be used with a keyed jack can be inserted into the keyed jack and successfully establish a connection using that keyed jack. Such physical keying techniques can be used with various types of cables including, for example, copper cables (such as ETHERNET cables that are terminated with keyed RJ-45 jacks) and fiber optic cables (such as optical cables that are terminated with keyed LC and MTP connectors).

Some applications, however, may require an additional layer of security beyond that which may be provided by such physical keying techniques.

In some applications, it is desirable to use Virtual Local Area Networks (VLANs). A network manager uses VLAN techniques to logically segment a physical Local Area Network (LAN) into different logical broadcast domains, where each logical broadcast domain is a separate VLAN. VLANs are used for many reasons (for example, to improve security or performance, simplify administration, or reduce costs). The Institute of Electrical and Electronics Engineers (IEEE) 802.1Q standard defines how VLANs can be implemented on ETHERNET networks.

When a particular end device is to be assigned to a particular VLAN, the network switch that the end device is directly connected to needs to be configured to insert appropriate VLAN tags into data frames received from the end device. The configuration of such edge network switches can be complex and error prone, especially when done manually.

SUMMARY

One embodiment is directed to an apparatus comprising one or more front connectors, wherein each front connector comprises a respective interface configured to read a storage device associated with a connector that is adapted to be connected to the front connector. The apparatus further comprises one or more rear connection points and one or more switches. The apparatus is configured to automatically configure the apparatus at least in part based on information read from the storage device.

Another embodiment is directed to a method of configuring an apparatus comprising one or more front connectors, one or more rear connectors, and one or more switches. The method comprises, in connection with a connector comprising a storage device being inserted into a first front connector, reading information from the storage device, and automatically configuring the apparatus at least in part based on information read from the storage device.

DETAILED DESCRIPTION

Figure 1:
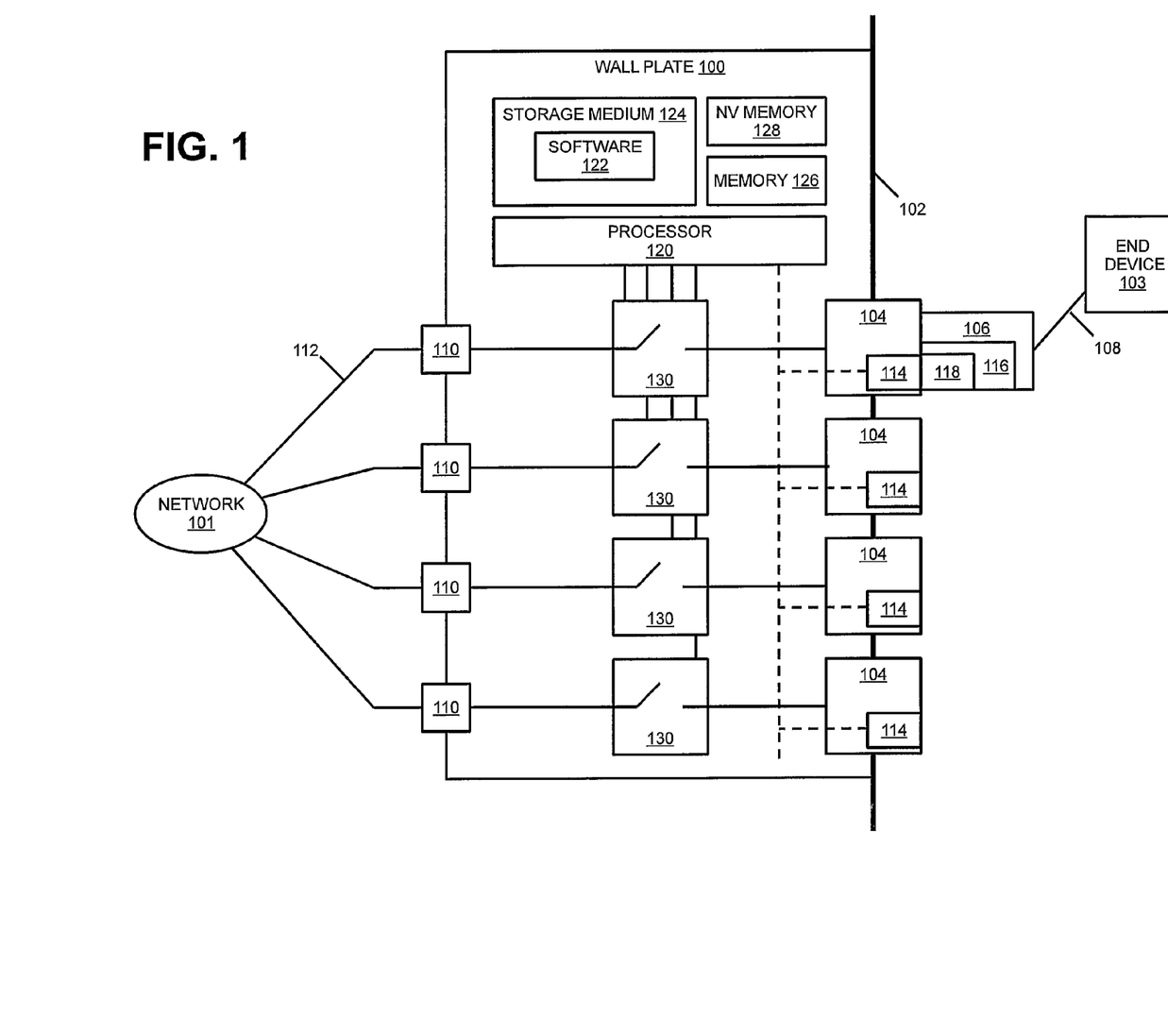
FIG. 1 is a block diagram of one exemplary embodiment of a wall plate that is configured to authenticate connectors and/or cables that are attached to it.

FIG. 1 is a block diagram of one exemplary embodiment of a wall plate 100 that is configured to authenticate connectors and/or cables that are attached to it. The exemplary embodiment of a wall plate 100 shown in FIG. 1 is described here as being implemented for use with copper ETHERNET cables that are terminated with RJ-45 connectors. However, it is to be understood that the techniques described here in connection with FIG. 1 can be used with other types of cables and connectors (such as other types of copper cables and connectors as well as cables that make use of other types of communication media such as fiber optic cables).

Moreover, although the embodiment shown in FIG. 1 is described here as being a wall plate, it is to be understood that the techniques described here can be implemented in a floor box, media converter, or other similar products.

In general, the wall plate 100 is used to provide a point at which end devices 103 can connect to one or more networks 101.

The wall plate 100 comprises a mounting interface for mounting the wall plate 100 to a wall or other structure. In the exemplary embodiment shown in FIG. 1, the mounting interface is implemented as a face plate 102 that attaches the other components of the wall plate 100 (or attaches a housing that contains such components) to a wall or other structure. In another embodiment, the mounting interface comprises a surface-mount wall box that houses the components of the wall plate 100 and attaches the components to a wall or other structure.

The wall plate 100 comprises one or more "front" connectors 104 that can be accessed from a front side of the wall plate 100. In the exemplary embodiment shown in FIG. 1, each of the front connectors 104 comprises an RJ-45 jack that is designed to receive an RJ-45 plug 106 attached to an ETHERNET cable 108. Consequently, the front connectors 104 are also referred to here as front jacks 104. Typically, the front jacks 104 are used to connect an end device 103 (such as a computer, printer, scanner, copier, telephone, or the like) to a network 101.

In the exemplary embodiment shown in FIG. 1, the wall plate 100 includes a respective rear connection point 110 for each front jack 104. Each rear connection point 110 is used to terminate a corresponding "horizontal run" ETHERNET cable 112. The other end of each horizontal run ETHERNET cable 112 is typically terminated at a patch panel, switch, hub, or other network device or assembly (located, for example, in an equipment closet or room) that is a part of at least one of the networks 101. In the exemplary embodiment shown in FIG. 1, each such horizontal run ETHERNET cable 112 is terminated at the respective rear connection point 110 using a permanent (that is, non-connectorized) attachment, for example, using a punch-down block. In other embodiments, each such horizontal run ETHERNET cable 112 is terminated in other ways (for example, using rear RJ-45 jacks).

Each front jack 104 includes an interface 114 for reading data stored in a storage device 116 attached to (or otherwise associated with) an RJ-45 plug 106 that is inserted into that front jack 104. The storage device 116 can be implemented using an Electrically Erasable Programmable Read-Only Memory (EEPROM) or other non-volatile memory device.

Each storage device 116 includes an interface 118 that is configured to communicatively couple with the interface 114 in the front jack 104 when the plug 106 is inserted into the front jack 104. In one embodiment, the interface 114 in each front jack 104 and the interface 118 included in each storage device 116 includes four contacts or leads. The interfaces 114 and 118 (as well as the jack 104 and the plug 106) are configured so that, when the plug 106 is inserted into the jack 104, each contact or lead in the interface 114 physically contacts the corresponding contact or lead in the interface 118. In one embodiment, the four contacts or leads included in the interfaces 114 and 118 include a power contact or lead for providing power from the wall plate 100 to the storage device 116, a ground contact or lead for providing a ground for the storage device 116, a data contact or lead for communicating data between the storage device 116 and a programmable processor 120 in the wall plate 100 and an extra contact or lead that is reserved for future use. In such an embodiment, a single data-line protocol (such as the UNI/O serial bus protocol) can be used to communicate over the data lead.

Examples of such interfaces 114 and storage devices 116 include those used in the QUAREO family of products that are commercially available from TE Connectivity Ltd. and those described in the following United States patent applications (all of which are hereby incorporated herein by reference): U.S. Provisional Patent Application Ser. No. 61/152,624, filed on Feb. 13, 2009, titled "MANAGED CONNECTIVITY SYSTEMS AND METHODS"; U.S. patent application Ser. No. 12/705,497, filed on Feb. 12, 2010, titled "AGGREGATION OF PHYSICAL LAYER INFORMATION RELATED TO A NETWORK"; U.S. patent application Ser. No. 12/705,501, filed on Feb. 12, 2010, titled "INTER-NETWORKING DEVICES FOR USE WITH PHYSICAL LAYER INFORMATION"; U.S. patent application Ser. No. 12/705,506, filed on Feb. 12, 2010, titled "NETWORK MANAGEMENT SYSTEMS FOR USE WITH PHYSICAL LAYER INFORMATION"; U.S. patent application Ser. No. 12/705,514, filed on Feb. 12, 2010, titled "MANAGED CONNECTIVITY DEVICES, SYSTEMS, AND METHODS"; U.S. Provisional Patent Application Ser. No. 61/252,964, filed on Oct. 19, 2009, titled "ELECTRICAL PLUG FOR MANAGED CONNECTIVITY"; U.S. Provisional Patent Application Ser. No. 61/252,395, filed on Oct. 16, 2009, titled "MANAGED CONNECTIVITY IN ELECTRICAL SYSTEMS"; U.S. Provisional Patent Application Ser. No. 61/253,208, filed on Oct. 20, 2009, titled "ELECTRICAL PLUG FOR MANAGED CONNECTIVITY"; U.S. patent application Ser. No. 12/907,724, filed on Oct. 19, 2010, titled "MANAGED ELECTRICAL CONNECTIVITY SYSTEMS"; U.S. Provisional Patent Application Ser. No. 61/303,948, filed on Feb. 12, 2010, titled "PANEL INCLUDING BLADE FEATURE FOR MANAGED CONNECTIVITY"; U.S. Provisional Patent Application Ser. No. 61/413,844, filed on Nov. 15, 2010, titled "COMMUNICATIONS BLADED PANEL SYSTEMS"; U.S. Provisional Patent Application Ser. No. 61/439,693, filed on Feb. 4, 2011, titled "COMMUNICATIONS BLADED PANEL SYSTEMS"; U.S. patent application Ser. No. 13/025,730, filed on Feb. 11, 2011, titled "COMMUNICATIONS BLADED PANEL SYSTEMS"; U.S. patent application Ser. No. 13/025,737, filed on Feb. 11, 2011, titled "COMMUNICATIONS BLADED PANEL SYSTEMS"; U.S. patent application Ser. No. 13/025,743, filed on Feb. 11, 2011, titled "COMMUNICATIONS BLADED PANEL SYSTEMS"; U.S. patent application Ser. No. 13/025,750, filed on Feb. 11, 2011, titled "COMMUNICATIONS BLADED PANEL SYSTEMS"; U.S. Provisional Patent Application Ser. No. 61/303,961; filed on Feb. 12, 2010, titled "Fiber Plug And Adapter For Managed Connectivity"; U.S. Provisional Patent Application Ser. No. 61/413,828, filed on Nov. 15, 2010, titled "Fiber Plugs And Adapters For Managed Connectivity"; U.S. Provisional Patent Application Ser. No. 61/437,504, filed on Jan. 28, 2011, titled "Fiber Plugs And Adapters For Managed Connectivity"; U.S. patent application Ser. No. 13/025,784, filed on Feb. 11, 2011, titled "Managed Fiber Connectivity Systems"; U.S. patent application Ser. No. 13/025,788, filed on Feb. 11, 2011, titled "Managed Fiber Connectivity Systems"; U.S. patent application Ser. No. 13/025,797, filed on Feb. 11, 2011, titled "Managed Fiber Connectivity Systems"; U.S. patent application Ser. No. 13/025,841, filed on Feb. 11, 2011, titled "Managed Fiber Connectivity Systems"; U.S. Provisional Patent Application Ser. No. 61/413,856, filed on Nov. 15, 2010, titled "CABLE MANAGEMENT IN RACK SYSTEMS"; U.S. Provisional Patent Application Ser. No. 61/466,696, filed on Mar. 23, 2011, titled "CABLE MANAGEMENT IN RACK SYSTEMS"; U.S. patent application Ser. No. 12/905,689, filed on Oct. 15, 2010, titled "MANAGED CONNECTIVITY IN ELECTRICAL SYSTEMS"; U.S. Provisional Patent Application Ser. No. 61/252,386, filed on Oct. 16, 2009, titled "MANAGED CONNECTIVITY IN FIBER OPTIC SYSTEMS"; U.S. patent application Ser. No. 12/905,658, filed on Oct. 15, 2010, titled "MANAGED CONNECTIVITY IN FIBER OPTIC SYSTEMS"; U.S. patent application Ser. No. 13/157,519, filed on Jun. 10, 2011, titled "SWITCH-STATE INFORMATION AGGREGATION"; and U.S. Provisional Patent Application Ser. No. 61/353,906, filed on Jun. 11, 2010, titled "SWITCH-STATE INFORMATION AGGREGATION".

Other interfaces 114 and 118 and contact arrangements and structures can be used.

In the exemplary embodiment shown in FIG. 1, the wall plate 100 includes at least one programmable processor 120 for executing software 122. The software 122 comprises program instructions that are stored (or otherwise embodied) on or in an appropriate non-transitory storage medium or media 124 (such as flash or other non-volatile memory, magnetic disc drives, and/or optical disc drives) from which at least a portion of the program instructions are read by the programmable processor 120 for execution thereby. Although the storage media 124 is shown in FIG. 1 as being included in, and local to, the wall plate 100, it is to be understood that remote storage media (for example, storage media that is accessible over a network) and/or removable media can also be used. Each wall plate 100 also includes memory 126 for storing the program instructions (and any related data) during execution by the programmable processor 120. Memory 126 comprises, in one implementation, any suitable form of random access memory (RAM) now known or later developed, such as dynamic random access memory (DRAM). In other embodiments, other types of memory are used.

In the exemplary embodiment shown in FIG. 1, the wall plate 100 includes a non-volatile memory 128 in which authentication information is stored at the wall plate 100 for use in the authentication processing described below. By including non-volatile memory 128 in the wall plate 100 for locally storing such authentication information at the wall plate 100, the wall plate 100 need not communicate with a central management system or database in connection with performing the authentication processing described below and, as a consequence, the wall plate 100 need not be configured to have a communication link to such a central management system or database.

The non-volatile memory 128 can be implemented in various ways (for example, using flash memory or an EEPROM). Moreover, the non-volatile memory 128 that is used for storing the authentication information can be integrated with the storage medium 124 used for storing the software 122 and/or the memory 126 used for storing the program instructions (and any related data) during execution by the programmable processor 120.

In the exemplary embodiment shown in FIG. 1, the programmable processor 120 is communicatively coupled to the interface 114 in each front jack 104 so that the programmable processor 120 (more specifically, the software 122 executing on the programmable processor 120) is able to read data from the storage device 116 attached to (or otherwise associated with) any plug 106 inserted into that front jack 104.

The wall plate 100 is configured to be able to communicatively couple each front jack 104 to its corresponding rear connection point 110 on a selective basis via a respective "open-close" switch 130. As used here, an "open-close" switch 130 refers to a switch 130 that is operable to either break (open) or complete (close) the communicative coupling between the respective front jack 104 and its corresponding rear connection point 110 at the physical layer (Layer 1) of the Open Systems Interconnection (OSI) model. An "open-close" switch 130 is different from the "network" switch 430 described below in connection with FIG. 4.

In the exemplary embodiment shown in FIG. 1, each front jack 104 is communicatively coupled to its corresponding rear connection point 110 by electrically connecting each conductor or wire in an ETHERNET cable 108 attached to the front jack 104 (via a corresponding contact in the jack 104) to a corresponding conductor or wire in the horizontal run ETHERNET cable 112 attached to the rear connection point 110. In this embodiment, each open-close switch 130 is electrically connected between each front jack 104 and its corresponding rear connection point 110 and is configured to electrically break (open) or complete (close) one or more of the electrical connections that are made between the wires in the ETHERNET cable 108 attached to the front jack 104 and the corresponding wires in the horizontal run ETHERNET cable 112.

In the exemplary embodiment shown in FIG. 1, normally open (NO) switches 130 are used (though it is to be understood that other open-close switches 130 such as normally closed (NC) switches could also be used).

The programmable processor 120 is coupled to a control input of each of the open-close switches 130 so that the programmable processor 120 (more specifically, the software 122 executing on the programmable processor 120) is able to open and close the switch 130 as described below. The programmable processor 120 can be coupled to the control input of each open-close switch 130 in any conventional manner (for example, using individual control lines or a shared bus).

The active components of the wall plate 100 can be powered in various ways. For example, power can be supplied to the wall plate 100 using "Power over Ethernet" (POE) technology (for example, using the POE technology described in the relevant Institute of Electrical and Electronics Engineers (IEEE) 802.3 standards). Such POE power can be supplied via one or more of the front jacks 104 that are otherwise used to provide communication service. Alternatively, an additional front connector can be provided on the wall plate 100 for the sole purpose of supplying POE power to the wall plate 100. Power can be supplied to the wall plate 100 in other ways, for example, from the alternate current (AC) main power grid. For example, the wall plate 100 can be hardwired to the AC main power grid, in which case the wall plate 100 can include a suitable AC/DC power supply to produce the DC power typically used by the active components of the wall plate 100. Alternatively, the wall plate 100 can be connected to the AC main power grid using an external power plug that is connected to an ordinary power outlet and to a power connector included in the wall plate 100, in which case the external power plug can include a suitable AC/DC power supply to produce the DC power typically used by the active components of the wall plate 100. Other ways to supply power to the wall plate 100 include power harvesting techniques such as integrating solar cells into the wall plate 100.

Figure 2:
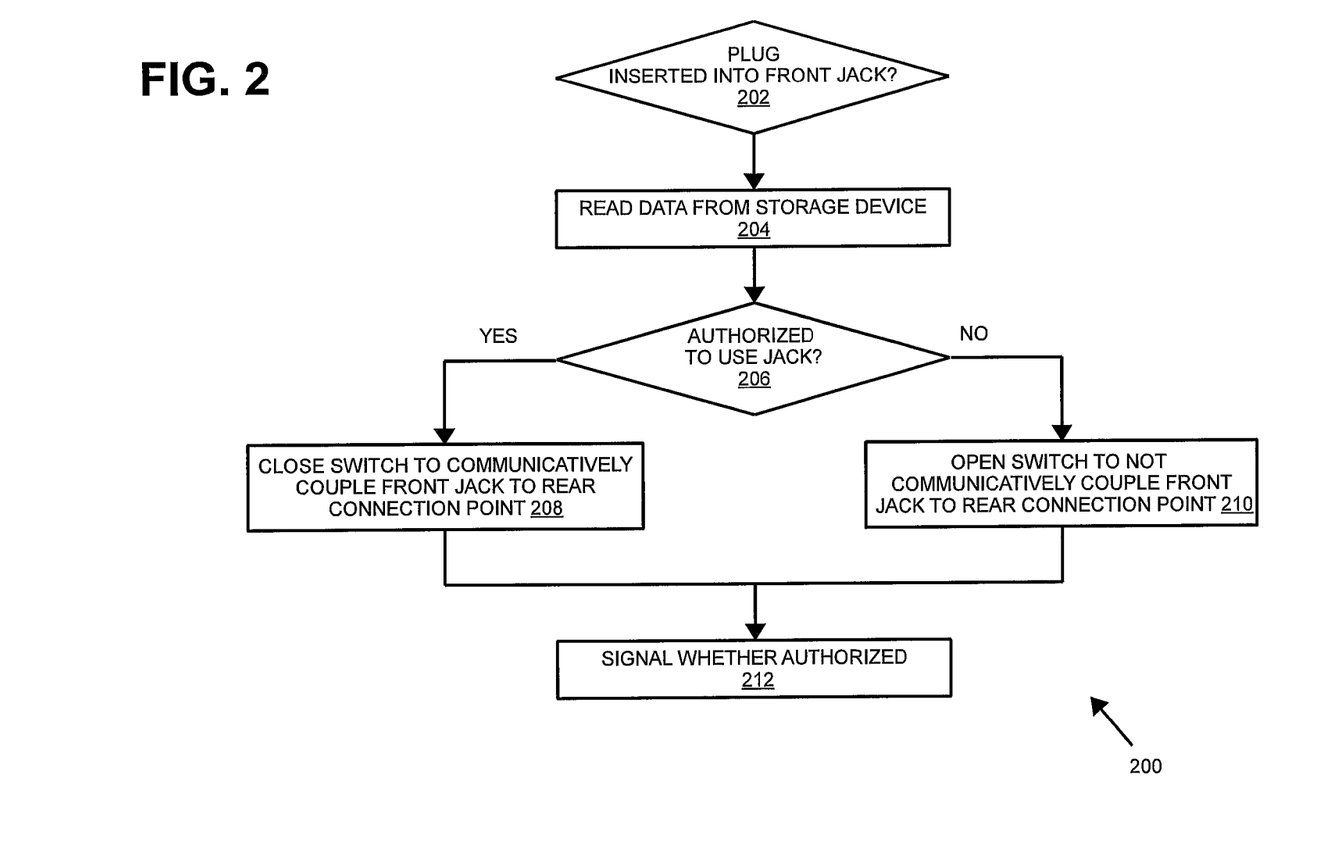
FIG. 2 is a flow diagram of an exemplary embodiment of a method of providing secure access to a network.

FIG. 2 is a flow diagram of an exemplary embodiment of a method 200 of providing secure access to a network 101. The exemplary embodiment of method 200 shown in FIG. 1 is described here as being implemented using the embodiment of a wall plate 100 shown in FIG. 1 (though is it is to be understood that the method 200 can be implemented in other ways). Moreover, in this exemplary embodiment, at least a portion of the processing associated with method 200 is implemented using the software 122 executing on the programmable processor 120 of the wall plate 100.

When a plug 106 attached to an ETHERNET cable 108 is inserted into a front jack 104 of the wall plate 100 (checked in block 202), the software 122 reads the data stored in the storage device 116 attached to (or otherwise associated with) that plug 106 (block 204). The insertion of a plug 106 into a front jack 104 can be detected using various approaches. For example, each front jack 104 can include a respective circuit that develops a first logic level on the data lead of the interface 114 of that front jack 104 when no plug 106 is inserted into the jack 104 and a second logic level on the data lead when a plug 106 is inserted into the front jack 104. Examples of such a circuit are described in U.S. patent application Ser. No. 13/157,519, filed on Jun. 10, 2011, titled "SWITCH-STATE INFORMATION AGGREGATION"; and U.S. Provisional Patent Application Ser. No. 61/353,906, filed on Jun. 11, 2010, titled "SWITCH-STATE INFORMATION AGGREGATION", both of which are hereby incorporated herein by reference. The insertion of a plug 106 into a front jack 104 can be detected in other ways.

The software 122 then uses at last some of the data read from the storage device 116 to determine if that plug 106 and/or the cable 108 attached thereto is authorized to use that jack 104 (block 206). If it is, the software 122 closes the corresponding open-close switch 130 (or permits the switch 130 to remain closed if it is already in the closed state) in order to communicatively couple that front jack 104 to the corresponding rear connection point 110 (block 208). If it is not, the software 122 opens the corresponding open-close switch 130 (or permits the switch 130 to remain open if it is already in the open state) so that the front jack 104 is not communicatively coupled to the corresponding rear connection point 110 (block 210). As noted above, in this exemplary embodiment, the software 122 interacts with the control input of the appropriate open-close switch 130 in order to open or close that switch 130.

In the exemplary embodiment shown in FIG. 2, the software 122 also signals whether or not the inserted plug 106 is authorized for use in that jack 104 (block 212). For example, the wall plate 100 can include one or more light emitting diodes (LEDs) that are illuminated, flashed, and/or have their color changed to indicate whether or not the inserted plug 106 is authorized for use in that jack 104. The wall plate 100 can also include a speaker or alarm that is used to provide an audio signal that indicates whether the inserted plug 106 is authorized for use in that jack 104. Other ways of signaling whether or not the inserted plug 106 is authorized for use in that jack 104 can be used.

In this exemplary embodiment, the software 122 determines if the plug 106 (and/or the cable 108 attached thereto) is authorized to use that jack 104 by checking if the data read from the storage device 116 includes one or more items of authentication information stored in the non-volatile memory 128 of the wall plate 100. As noted above, by locally storing such authentication information at the wall plate 100, the software 122 need not communicate with a central management system or database in connection with determining if the plug 106 and/or cable 108 is authorized and, as a consequence, the wall plate 100 need not be configured to have a communication link to a central management system or database, which can reduce the cost and/or complexity of implementing such an authentication system.

The data used for such authentication processing can include data that identifies a particular visible attribute of the plug 106 and/or the cable 108. For example, in one application, only cables 108 of a certain color are authorized to be used with certain jacks 104. In such an example, the data read from the storage devices 116 includes data indicative of the color of the cable 108.

The data used for such authentication processing can include data that is not visible to a user of the cable 108. For example, in one application, only cables 108 that have a predetermined secret key stored in its storage device 116 are authorized to be used with certain jacks 104.

Data that is stored in the storage device 116 at the time the cable 108 (or the plug 106) is manufactured or assembled can be used for this type of authentication. For example, in one application, data that identifies an attribute of the plug 106 or cable 108 that is fixed or otherwise determined at the time the cable 108 or plug 106 is manufactured or assembled can be used for this type authentication, in which case data that indicates whether or not each plug 106 or cable 108 has that attribute can be written to the corresponding storage device 116 when the cable 108 is manufactured or assembled. In this example, appropriate authentication information can also be written to the non-volatile memory 128 of the wall plate 100 at the time the wall plate 100 is manufactured or assembled. Then, as described above in connection with method 200, the software 122 determines if a particular plug 106 that is inserted into a front jack 104 is authorized to use that jack 104 by checking if the data read from the storage device 116 of the inserted plug 106 includes data that indicates that the plug 106 or cable 108 has the specified attribute. If it does, the plug 106 and associated cable 108 are authorized to use that jack. If it does not, the plug 106 and associated cable 108 are not authorized to use that jack. In this way, an appropriate off-the-shelf wall plate 100 and off-the-shelf cables 108 can be used "as is" to implement such an authentication scheme, thereby avoiding the need to write information to the non-volatile memory 128 of the wall plate 100 or to the storage devices 116 of the plugs 106 "in the field" for the purposes of the authentication processing described here.

Other types of data can be written to the non-volatile memory 128 of the wall plate 100 and/or the storage devices 116 of the plugs 106 at the time of manufacture or assembly for authentication purposes (for example, other types of authenticate codes and encryption keys).

Data that is written in the field to the non-volatile memory 128 of the wall plate 100 and/or the storage devices 116 of the cables 108 can also used for this type of authentication. For example, in one application, a predetermined key is written in the field to the storage devices 116 of those cables 108 that are authorized to use a particular jack 104. Also, in this application, the predetermined key is written in the field to the non-volatile memory 128 of the wall plate 100. Then, as described above in connection with method 200, the software 122 determines if a particular plug 106 that is inserted into a front jack 104 is authorized to use that jack 104 by checking if the data read from the storage device 116 of the inserted plug 106 includes that predetermined key. If it does, the plug 106 and associated cable 108 are authorized to use that jack. If it does not, the plug 106 and associated cable 108 are not authorized to use that jack. In this way, a higher or more customized degree of security can be implemented using such an authentication scheme (for example, where it is not desirable to permit the manufacturers of the wall plate 100 or cables 108 to have access to the data used in the authentication processing described here and/or where it is desirable to change the authentication data from time to time).

Other types of data can be written in the field to the non-volatile memory 128 of the wall plate 100 and/or the storage devices 116 of the plugs 106 for such authentication processing (for example, other types of authenticate codes and encryption keys).

Data can be written to the non-volatile memory 128 of the wall plate 100 by including an appropriate interface (for example, a USB interface or wireless interface) in the wall plate 100 for connecting a laptop, smartphone, computer or similar device in order to write authentication information to the non-volatile memory 128 of the wall plate 100. Moreover, if such a laptop, smartphone, computer or similar device includes a jack that also includes an interface that is compatible with the interface 118 used with the storage devices 116 in the plugs 106, such a device can also be used to write data to those storage devices 116.

Figure 3:
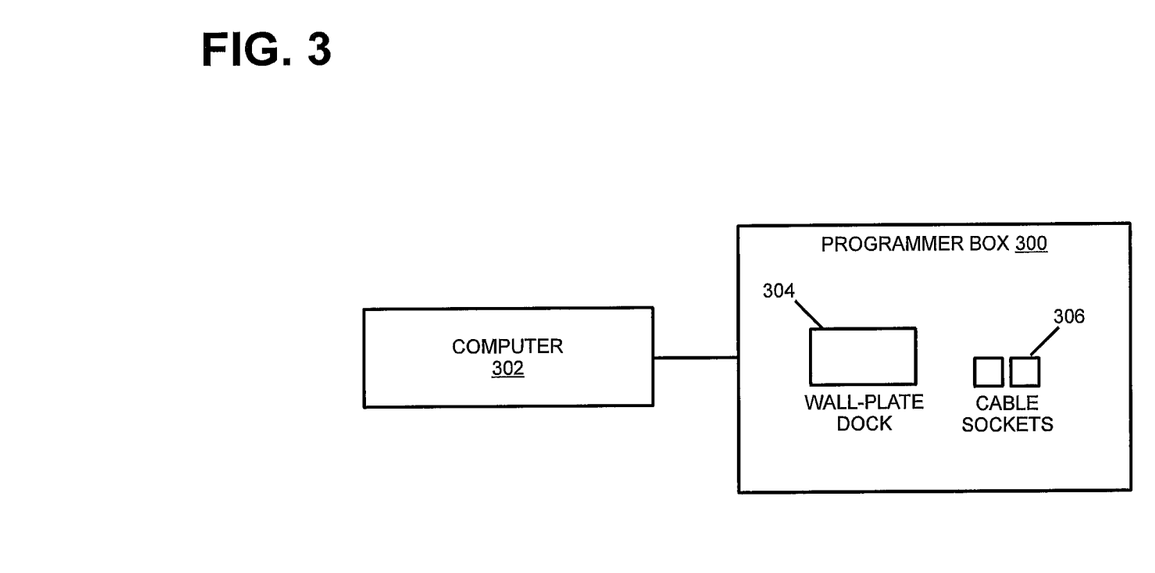
FIG. 3 is a diagram illustrating one example of a programmer box.

Alternatively, a specially designed programmer box (for example, a programmer box 300 of the type shown in FIG. 3) can be used to write data to the non-volatile memory 128 of the wall plate 100 and/or the storage devices 116 of the plugs 106. Such a programmer box 300 can include appropriate interfaces to write data to the non-volatile memory 128 of the wall plate 100 and/or the storage device 116 of a plug 106 (for example, a USB or wireless interface in the case of the non-volatile memory 128 of the wall plate 100 or an interface compatible with the interface 118 used by the storage devices 116 in the plugs 106). For example, in the example shown in FIG. 3, the programmer box 300 is configured to be connected to a computer 302 (for example, via a wired or wireless connection such as a USB or BLUETOOTH connection) so that the computer 302 can write data to the non-volatile memory 128 of a wall plate 100 inserted into a dock 304 included in the programmer box 300 and write data to the storage device 116 of a plug 106 inserted into a cable socket 306 included in the programmer box 300. In other examples, the programmer box is designed for writing data to the non-volatile memory 128 of a wall plate 100 or writing data to the storage device 116 of a plug 106, but not both. It is to be understood, however, that data can be written to the non-volatile memory 128 of a wall plate 100 and/or the storage devices 116 of the plugs 106 in other ways.

The wall plate 100 can be configured to communicatively couple each front jack 104 to its corresponding rear connection point 110 on a selective basis in other ways.

For example, the communicative coupling between the respective front jack 104 and its corresponding rear connection point 110 can be broken in other ways. In one such example, each switch 130 can be configured to electrically break one or more of the electrical connections that are made between the wires in the ETHERNET cable 108 attached to the front jack 104 and the corresponding wires in the horizontal run ETHERNET cable 112 by electrically shorting such wires to an abnormal load and/or to one another (instead of creating an open circuit).

Also, other types of switches can be used. One such example is shown in FIG. 4.

Figure 4:
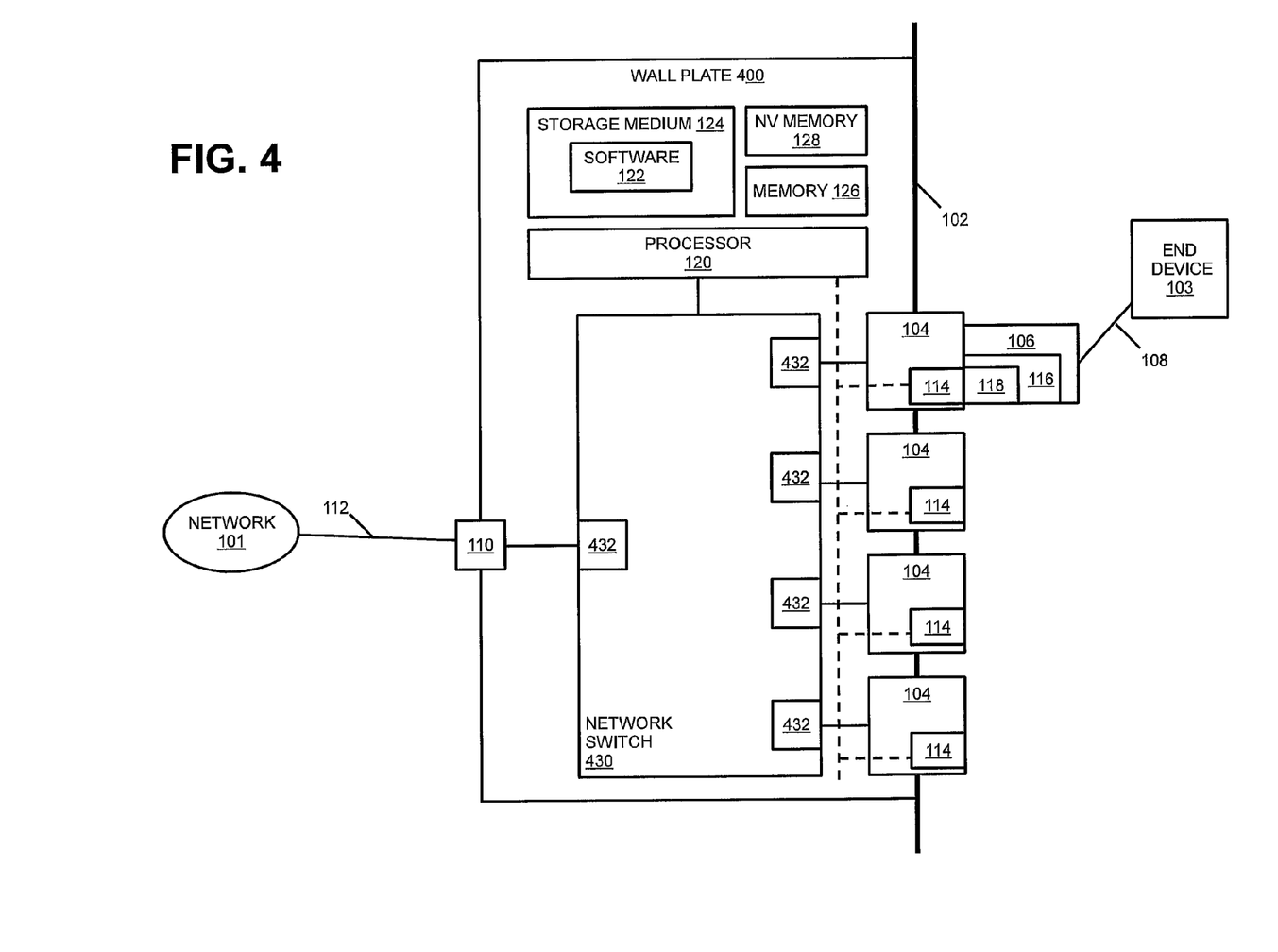
FIG. 4 is a block diagram of another exemplary embodiment of a smart wall plate that is configured to authenticate connectors and/or cables that are attached to it.

FIG. 4 is a block diagram of another exemplary embodiment of a smart wall plate 400 that is configured to authenticate connectors and/or cables that are attached to it.

The elements of the exemplary embodiment shown in FIG. 4 that are similar to corresponding elements of the exemplary embodiment shown in FIG. 1 are referenced in FIG. 4 using the same reference numerals used in FIG. 1. Except as described below, the description of the elements set forth above in connection with the exemplary embodiment shown in FIG. 1 applies to the corresponding elements of the exemplary embodiment shown in FIG. 4 but generally will not be repeated in connection with FIG. 4 for the sake of brevity.

In the exemplary embodiment shown in FIG. 4, the wall plate 400 includes a network switch 430 having a plurality of switch ports 432. As used here, a network switch 430 refers to a device that forwards or routes data among the switch ports 432 at the data link layer (Layer 2) of the OSI model, the network layer (Layer 3) of the OSI model, and/or higher layers of the OSI model. This is in contrast with the open-close switches 130 used in the exemplary embodiment described in connection with FIG. 1, where the "open-close" switching occurs at the physical layer (Layer 1) of the OSI model.

Moreover, in the exemplary embodiment shown in FIG. 4, the wall plate 400 includes a single rear connection point 110 that is used to terminate a corresponding "horizontal run" ETHERNET cable 112. The other end of the horizontal run ETHERNET cable is typically terminated at a patch panel, switch, hub, or other network device or assembly (located, for example, in an equipment closet or room) that is a part of at least one of the networks 101. In the exemplary embodiment shown in FIG. 4, the horizontal run ETHERNET cable 112 is terminated at the respective rear connection point 110 using a permanent (that is, non-connectorized) attachment, for example, using a punch-down block. In other embodiments, the horizontal run ETHERNET cable 112 is terminated in other ways (for example, using rear RJ-45 jacks).

In the exemplary embodiment shown in FIG. 4, each of the font jacks 104 and the rear connection point 110 are connected to a respective switch port 432 of the network switch 430. In general, the wall plate 400 is configured to communicatively couple devices attached to the front jacks 104 of the wall plate 104 to the networks 101 using the connection provided by the rear connection point 110 and the attached horizontal run ETHERNET cable 112. This is done by the network switch 430 forwarding packets among the switch ports 432 attached to the front jacks 104 and the switch port 432 attached to the rear connection point 110.

In the exemplary embodiment shown in FIG. 4, the wall plate 400 is configured to be able to communicatively couple each front jack 104 to the rear connection point 110 on a selective basis by enabling and disabling the switch port 432 that is connected to that front jack 104.

In this exemplary embodiment, the network switch 430 is configured so that each of the switch ports 432 can be enabled or disabled under the control of the programmable processor 120. The programmable processor 120 is communicatively coupled to the network switch 430 in order to do this. For example, in one implementation of such an embodiment, the network switch 430 is implemented using an ETHERNET switch chipset that includes one or more media access control (MAC) devices or chips and one or more physical layer (PHY) devices or chips or that includes a single chip that includes both the MAC device and the PHY device. In such an implementation, the programmable processor 120 uses an appropriate interface provided by the ETHERNET switch chipset to enable and disable the switch ports 432 at the physical layer level. The programmable processor 120 does this, in such an implementation, by storing appropriate values in the configuration registers included in the PHY device for enabling and disabling the switch ports 432.

In this exemplary embodiment, each switch port 432 that is connected to a front jack 104 is normally disabled. That is, when no plug 106 is inserted into a front jack 104, the software 122 disables the switch port 432 associated with that front jack 104. In this embodiment, the switch port 432 that is connected to the rear connection point 110 is normally enabled.

The enabling and disabling of the switch ports 432 can be done in other ways (for example, at Layer 2 or Layer 3 by only forwarding packets received on an enabled switch port 432 while dropping (that is, not forwarding) packets received on a disabled switch port 432 and/or by normally enabling the switch ports 432 instead of normally enabling the switch ports 432).

The authentication processing described above in connection with method 200 can be performed using the wall plate 400 shown in FIG. 4. However, the processing associated with blocks 208 and 210 is modified to take into account the differences between wall plate 100 and wall plate 400. When method 200 is implemented using the wall plate 400 shown in FIG. 4, if the software 122 determines that a plug 106 inserted into a front jack 104 (and/or the cable 108 attached to the plug 106) is authorized to use that front jack 104, the software 122 enables the switch port 432 associated with that front jack 104 (or permits that switch port 432 to remain enabled if that switch port 432 was already enabled). Likewise, if the software 122 determines that the plug 106 (and/or the cable 108 attached to the plug 106) is not authorized to use that front jack 104, the software 122 disables the switch port 432 associated with that front jack 104 (or keeps that switch port 432 disabled if that switch port 432 was already disabled).

As with the wall plate 100 show in FIG. 1, by including non-volatile memory 128 in the wall plate 400 for locally storing such authentication information at the wall plate 400, the wall plate 400 need not communicate with a central management system or database in connection with performing the authentication processing described here and, as a consequence, the wall plate 400 need not be configured to have a communication link to such a central management system or database, which can reduce the cost and/or complexity of implementing such an authentication system.

Figure 5:
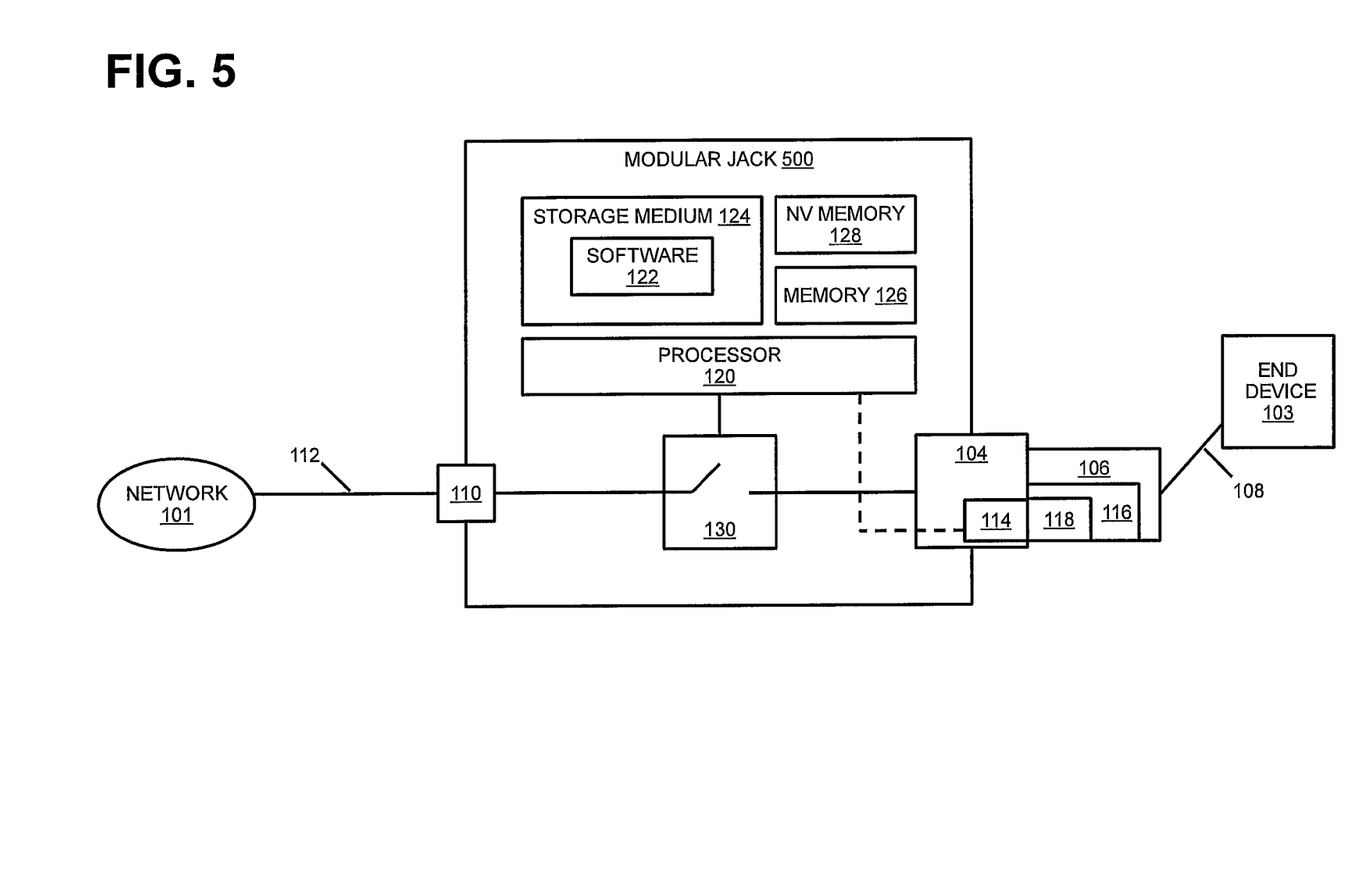
FIG. 5 is a block diagram of an exemplary embodiment of a smart modular jack that is configured to authenticate a connector and/or cable that is attached to it.

FIG. 5 is a block diagram of an exemplary embodiment of a smart modular jack 500 that is configured to authenticate a connector and/or cable that is attached to it.

The embodiment shown in FIG. 5 is the same as the embodiment shown in FIG. 1 except that the embodiment shown in FIG. 5 is implemented as modular jack 500 having a single front jack 104, a single rear connection point 110, and a single open-close switch 130 for communicatively coupling the front jack 104 and the rear connection point 110 on a selective basis.

The elements of the exemplary embodiment shown in FIG. 5 that are similar to corresponding elements of the exemplary embodiment shown in FIG. 1 are referenced in FIG. 5 using the same reference numerals used in FIG. 1. Except as described below, the description of the elements set forth above in connection with the exemplary embodiment shown in FIG. 1 applies to the corresponding elements of the exemplary embodiment shown in FIG. 5 but generally will not be repeated in connection with FIG. 4 for the sake of brevity.

The modular jack 500 can be designed to be installed in a standard floor box, wall plate, or other faceplate product in order to retro-fit such products with the authentication functionality described here. This can be done by replacing the convention modular jacks installed in such products with smart modular jacks 500.

As with the wall plate 100 show in FIG. 1, by including non-volatile memory 128 in the modular jack 500 for locally storing such authentication information at the modular jack 500, the modular jack 500 need not communicate with a central management system or database in connection with performing the authentication processing described here and, as a consequence, the modular jack 500 need not be configured to have a communication link to such a central management system or database, which can reduce the cost and/or complexity of implementing such an authentication system. This is especially desirable in retro-fit applications.

As noted above, although the exemplary embodiments shown in FIGS. 1-5 are described here as being implemented for use with copper ETHERNET cables that are terminated with RJ-45 connectors, it is to be understood that the techniques described here in connection with FIGS. 1-5 can be used with other types of cables and connectors (such as other types of copper cables and connectors as well as cables that make use of other types of communication media such as fiber optic cables).

For example, the passive wall plate 100 shown in FIG. 1 and the modular jack 500 shown in FIG. 5 can modified for use with optical connectors. In such modified devices, the device can be configured to optically couple each front jack to its corresponding rear connection point on a selective basis via a respective optical "open-close" switch. In such an example, each optical open-close switch is configured to either break (open) or complete (close) the optical coupling between the respective front jack and its corresponding rear connection point at the physical layer. This can be done, for example, using a suitable optical shutter or micro-electro-mechanical systems (MEMS) device.

Also, the active wall plate 400 of FIG. 4 can be modified for use with optical connectors and optical physical layer (PHY) devices.

Moreover, the techniques described here can be used in similar devices that perform media conversion.

Furthermore, in the exemplary embodiments described above, data read from storage devices 116 attached to (or otherwise associated with) plugs 106 (or other connectors) is used to automatically configure a wall plate, modular jack, or similar device. In those exemplary embodiments, this data is used to automatically configure the wall plate, modular jack, or similar device by configuring the wall plate, modular jack, or similar device to enable an end device 103 to access the network 101 using the front jack 104 to which that end device 103 is connected. This configuration is also done in a distributed manner (that is, the wall plate, modular jack, or similar device does not need to be connected to a central management system or database in order such configuration to occur).

However, data read from storage devices 116 attached to (or otherwise associated with) plugs 106 (or other connectors) can be used for performing other types of configuration in an automatic and/or distributed manner.

Figure 6:
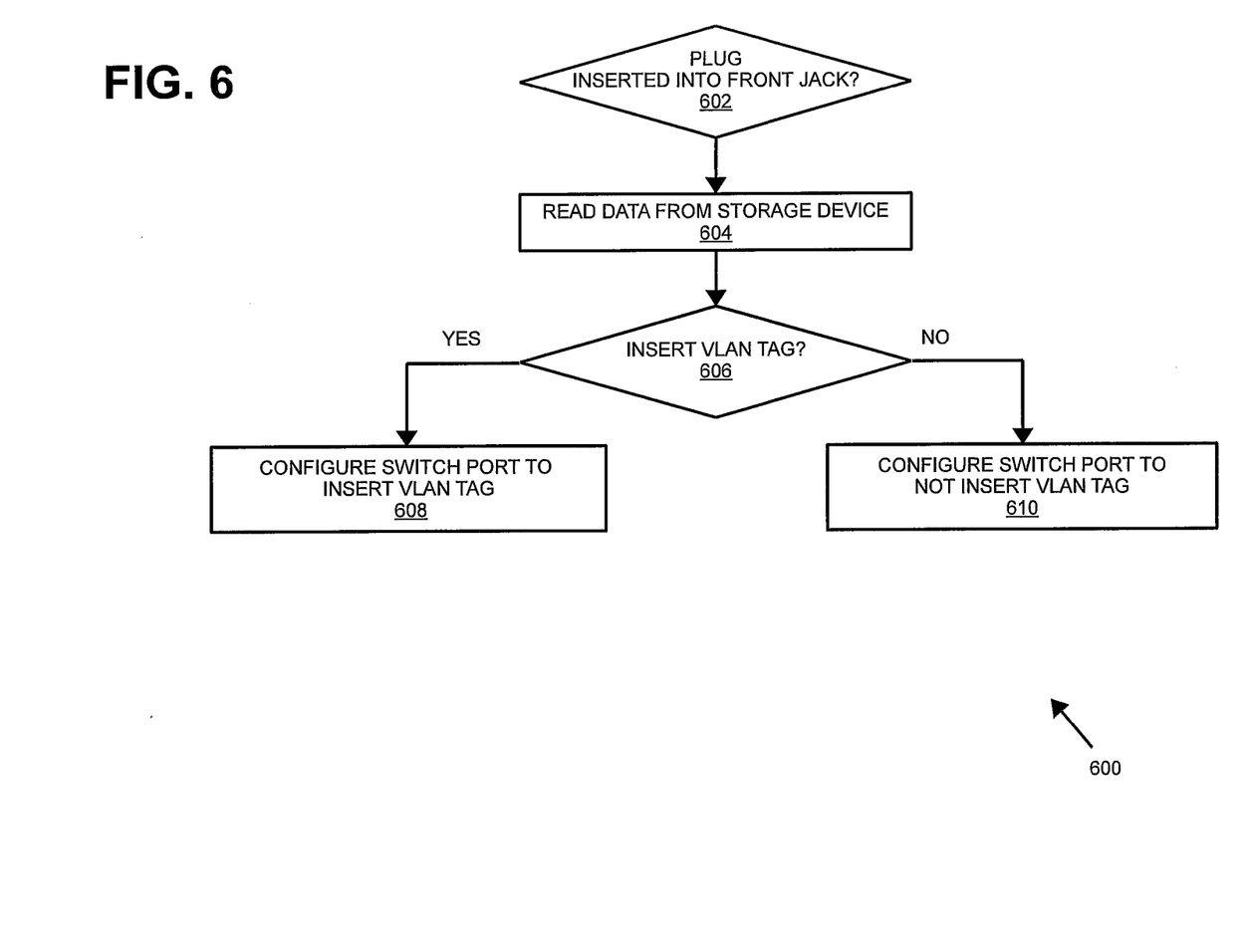
FIG. 6 is a flow diagram of an exemplary embodiment of a method of performing automatic VLAN configuration in a network switch.

FIG. 6 is a flow diagram of an exemplary embodiment of a method 600 of performing automatic VLAN configuration in a network switch. The embodiment of method 600 shown in FIG. 6 is described here as being implemented in the wall plate 400 shown in FIG. 4, though it is to be understood that method 600 can be implemented in other ways and/or using other types of network switches.

When a plug 106 attached to an ETHERNET cable 108 is inserted into a front jack 104 of the wall plate 400 (checked in block 602), the software 122 reads the data stored in the storage device 116 attached to (or otherwise associated with) that plug 106 (block 604). As noted above, the insertion of a plug 106 into a front jack 104 can be detected using various approaches.

The software 122 then uses at last some of the data read from the storage device 116 to determine if the switch port 432 corresponding to that front jack 104 should be configured to insert a VLAN tag into data frames received on that front jack 104 from the attached cable 108 (block 606). For example, the data that is stored in the storage device 116 of the plug 106 can include data that indicates whether such a VLAN tag should be inserted and, if so, what VLAN tag should be inserted. This VLAN data can be written to the storage device 116 when the associated plug 106 and/or cable 108 is manufactured or assembled and/or written to the storage device 116 in the field.

If the data read from the storage device 116 indicates that a particular VLAN tag should be inserted, the software 122 configures the corresponding switch port 432 to insert the particular VLAN tag indicated by the data read from the storage device 116 (or permit the switch port 432 to continue inserting such a VLAN tag if it was already configured to do so) (block 608).

If the data read from the storage device 116 does not indicate that a particular VLAN tag should be inserted, the software 122 configures the corresponding switch port 432 to not insert a VLAN tag (or permit the switch port 432 to continue not inserting a VLAN tag if it was already configured to do so) (block 610).

It is noted that in some other embodiments, if the data read from the storage device 116 does not indicate that a particular VLAN tag should be inserted, the software 122 configures the corresponding switch port 432 to insert a default VLAN tag (or permit the switch port 432 to continue inserting a default VLAN tag if it was already configured to do so).

The programmable processor 120 interacts with the network switch 430 in order to configure each switch port 432 to insert or not insert VLAN tags (for example, by storing appropriate values to registers provided in the network switch 430 for configuring the switch ports 432).

In this embodiment, the processing associated with method 600 is performed for each of the front jacks 104. In this way, VLAN configuration of the wall plate 400 can be carried out automatically. For example, each VLAN implemented using the network 101 can be associated with a respective cable color. When a cable 108 having a color associated with a particular VLAN is inserted into a front jack 104 of the wall plate 400, cable color data stored in the storage device 116 attached to the corresponding plug 106 indicates to the software 122 that the switch port 432 associated with that front jack 104 should be configured to insert an appropriate VLAN tag for the VLAN associated with that cable color. In this way, VLAN configuration can be carried by simply selecting an appropriately colored cable, which can reduce the burden associated with VLAN configuration.

Moreover, if the VLAN configuration data needed by the software 122 to carry out the processing associated with method 600 is stored locally at the wall plate 400 (for example, in the non-volatile memory 128), the wall plate 400 need not communicate with a central management system or database in connection with performing the VLAN configuration processing described here and, as a consequence, the wall plate 400 need not be configured to have a communication link to such a central management system or database, which can reduce the cost and/or complexity of implementing such a VLAN configuration system.

Also, as noted above, the automatic VLAN configuration described here can be implemented in other types of network switches (for example, in network switches other than a wall-plate network switch of the type shown in FIG. 4).

A number of embodiments have been described. Nevertheless, it will be understood that various modifications to the described embodiments may be made without departing from the spirit and scope of the claimed invention. For example, some of the described embodiments include non-volatile memory 128 for locally storing information that is used by the software 122, which can eliminate the need for the software 122 to communicate with a central management system or database in connection with some of the processing the software 122 performs. However, it is to be understood that in other embodiments, the software 122 can be configured to communicate with a central management system or database in connection (for example, in connection with some of the processing described above). Also, in other embodiments, non-volatile memory is not provided in the wall plate, modular jack, or similar device for use in connection with the processing described above. Furthermore, in other embodiments, an RFID tag is attached to or otherwise associated with each plug or other connector, and the wall plate, modular jack, or similar device includes one or more RFID readers to read data from the RFID tag in connection with the authentication or other configuration processing described above.

Example Embodiments

Example 1 includes an apparatus comprising one or more front connectors, wherein each front connector comprises a respective interface configured to read a storage device associated with a connector that is adapted to be connected to the front connector; one or more rear connection points; and one or more switches; wherein the apparatus is configured to automatically configure the apparatus at least in part based on information read from the storage device.

Example 2 includes the apparatus of Example 1, wherein the apparatus is configured to determine, in connection with the connector comprising the storage device being inserted into a first one of the front connectors, if the inserted connector or a cable attached to the inserted connector is authorized to use the first front connector based at least in part on information read from the storage device.

Example 3 includes the apparatus of Example 2, wherein the apparatus is configured to determine if the inserted connector or a cable attached to the inserted connector is authorized to use the first front connector based at least in part on information read from the storage device and other information that is locally stored at the apparatus.

Example 4 includes the apparatus of Example 2, further comprising a light emitting diode, wherein the apparatus is further configured to visually signal, using the light emitting diode, if the inserted connector or a cable attached to the inserted connector is authorized to use the first front connector.

Example 5 includes the apparatus of any of the Examples 1-4, wherein the apparatus is configured to communicatively couple at least one of the front connectors to at least one of the rear connection points on a selective basis depending at least in part based on information read from the storage device.

Example 6 includes the apparatus of any of the Examples 1-5, wherein the apparatus is configured to perform automatic VLAN configuration based at least in part on information read from the storage device. Example 7 includes the apparatus of any of the Examples 1-6, wherein the apparatus comprises a faceplate adapted to provide access to the one or more front connectors.

Example 8 includes the apparatus of any of the Examples 1-7, wherein the apparatus comprises at least one of a wall plate, a floor box, a modular jack, and a media converter. Example 9 includes the apparatus of any of the Examples 1-8, wherein the switch comprises an open-close switch. Example 10 includes the apparatus of any of the Examples 1-9, wherein the switch comprises a network switch.

Example 11 includes the apparatus of any of the Examples 1-10, wherein the information read from the storage device that is used to automatically configure the apparatus comprises at least one of: information that identifies a visible attribute of the associated connector or a cable to which the connector is attached; and information that is not associated with a visible attribute of the associated connector or a cable to which the connector is attached. Example 12 includes the apparatus of any of the Examples 1-11, wherein each front connector is configured to have a connector attached to one of copper cabling and fiber optic cabling.

Example 13 includes a method of configuring an apparatus comprising one or more front connectors, one or more rear connectors, and one or more switches, the method comprising: in connection with a connector comprising a storage device being inserted into a first front connector: reading information from the storage device; and automatically configuring the apparatus at least in part based on information read from the storage device.

Example 14 includes the method of Example 13, wherein automatically configuring the apparatus at least in part based on information read from the storage device comprises: determining if the inserted connector or a cable attached to the inserted connector is authorized to use the first front connector based at least in part on information read from the storage device.

Example 15 includes the method of Example 14, wherein determining if the inserted connector or a cable attached to the inserted connector is authorized to use the first front connector based at least in part on information read from the storage device comprises: determining if the inserted connector or a cable attached to the inserted connector is authorized to use the first front connector based at least in part on information read from the storage device and other information that is locally stored at the apparatus.

Example 16 includes the method of any of the Examples 14-15, further comprising visually signaling if the inserted connector or a cable attached to the inserted connector is authorized to use the first front connector.

Example 17 includes the method of any of the Examples 13-16, wherein automatically configuring the apparatus at least in part based on information read from the storage device comprises: communicatively coupling at least one of the front connectors to at least one of the rear connection points on a selective basis depending at least in part based on information read from the storage device.

Example 18 includes the method of any of the Examples 13-17, wherein automatically configuring the apparatus at least in part based on information read from the storage device comprises: performing automatic VLAN configuration based at least in part on information read from the storage device.

Example 19 includes the method of any of the Examples 13-18, wherein the information read from the storage device that is used to automatically configure the apparatus comprises at least one of: information that identifies a visible attribute of the associated connector or a cable to which the connector is attached; and information that is not associated with a visible attribute of the associated connector or a cable to which the connector is attached.

Example 20 includes the method of any of the Examples 13-19, wherein the apparatus comprises a network switch, wherein the first front connector into which the connector associated with the storage device is inserted is connected to a first switch port of the network switch, and wherein automatically configuring the apparatus at least in part based on information read from the storage device comprises: using information read from the storage device to determine if the network switch should be configured to insert a VLAN tag into data frames received on the first front connector into which the connector associated with the storage device is inserted.

What is claimed:

1. An apparatus comprising:
   one or more front connectors, wherein each front connector comprises a respective interface configured to read a storage device associated with a connector that is adapted to be connected to the front connector;
   one or more rear connection points; and
   one or more switches;
   wherein the apparatus is configured to automatically configure the apparatus at least in part based on information read from the storage device;
   wherein the storage device is attached to the connector such that the storage device becomes communicatively coupled with an interface of the front connector when the connector is inserted into the front connector.

2. The apparatus of claim 1, wherein the apparatus is configured to determine, in connection with the connector comprising the storage device being inserted into a first one of the front connectors, if the inserted connector or a cable attached to the inserted connector is authorized to use the first front connector based at least in part on information read from the storage device.

3. The apparatus of claim 2, wherein the apparatus is configured to determine if the inserted connector or a cable attached to the inserted connector is authorized to use the first front connector based at least in part on information read from the storage device and other information that is locally stored at the apparatus.

4. The apparatus of claim 2, further comprising a light emitting diode, wherein the apparatus is further configured to visually signal, using the light emitting diode, if the inserted connector or a cable attached to the inserted connector is authorized to use the first front connector.

5. The apparatus of claim 1, wherein the apparatus is configured to communicatively couple at least one of the front connectors to at least one of the rear connection points on a selective basis depending at least in part based on information read from the storage device.

6. The apparatus of claim 1, wherein the apparatus is configured to perform automatic Virtual Local Area Network (VLAN) configuration based at least in part on information read from the storage device.

7. The apparatus of claim 1, wherein the apparatus comprises a faceplate adapted to provide access to the one or more front connectors.

8. The apparatus of claim 1, wherein the apparatus comprises at least one of a wall plate, a floor box, a modular jack, and a media converter.

9. The apparatus of claim 1, wherein the switch comprises an open-close switch.

10. The apparatus of claim 1, wherein the switch comprises a network switch.

11. The apparatus of claim 1, wherein the information read from the storage device that is used to automatically configure the apparatus comprises at least one of:
    information that identifies a visible attribute of the associated connector or a cable to which the connector is attached; and
    information that is not associated with a visible attribute of the associated connector or a cable to which the connector is attached.

12. The apparatus of claim 1, wherein each front connector is configured to have a connector attached to one of copper cabling and fiber optic cabling.

13. A method of configuring an apparatus comprising one or more front connectors, one or more rear connectors, and one or more switches, the method comprising:
    in connection with a connector comprising a storage device being inserted into a first front connector:
       reading information from the storage device, wherein the storage device is attached to the connector such that the storage device becomes communicatively coupled with an interface of the first front connector when the connector is inserted into the first front connector; and
       automatically configuring the apparatus at least in part based on information read from the storage device.

14. The method of claim 13, wherein automatically configuring the apparatus at least in part based on information read from the storage device comprises:
    determining if the inserted connector or a cable attached to the inserted connector is authorized to use the first front connector based at least in part on information read from the storage device.

15. The method of claim 14, wherein determining if the inserted connector or a cable attached to the inserted connector is authorized to use the first front connector based at least in part on information read from the storage device comprises:
    determining if the inserted connector or a cable attached to the inserted connector is authorized to use the first front connector based at least in part on information read from the storage device and other information that is locally stored at the apparatus.

16. The method of claim 14, further comprising visually signaling if the inserted connector or a cable attached to the inserted connector is authorized to use the first front connector.

17. The method of claim 13, wherein automatically configuring the apparatus at least in part based on information read from the storage device comprises:
    communicatively coupling at least one of the front connectors to at least one of the rear connection points on a selective basis depending at least in part based on information read from the storage device.

18. The method of claim 13, wherein automatically configuring the apparatus at least in part based on information read from the storage device comprises:

performing automatic Virtual Local Area Network (VLAN) configuration based at least in part on information read from the storage device.

19. The method of claim 13, wherein the information read from the storage device that is used to automatically configure the apparatus comprises at least one of:
   information that identifies a visible attribute of the associated connector or a cable to which the connector is attached; and
   information that is not associated with a visible attribute of the associated connector or a cable to which the connector is attached.

20. The method of claim 13, wherein the apparatus comprises a network switch, wherein the first front connector into which the connector associated with the storage device is inserted is connected to a first switch port of the network switch, and wherein automatically configuring the apparatus at least in part based on information read from the storage device comprises:
   using information read from the storage device to determine if the network switch should be configured to insert a Virtual Local Area Network (VLAN) tag into data frames received on the first front connector into which the connector associated with the storage device is inserted.

* * * * *